Inventor:
William S. Edsall,
by [signature] Attorney

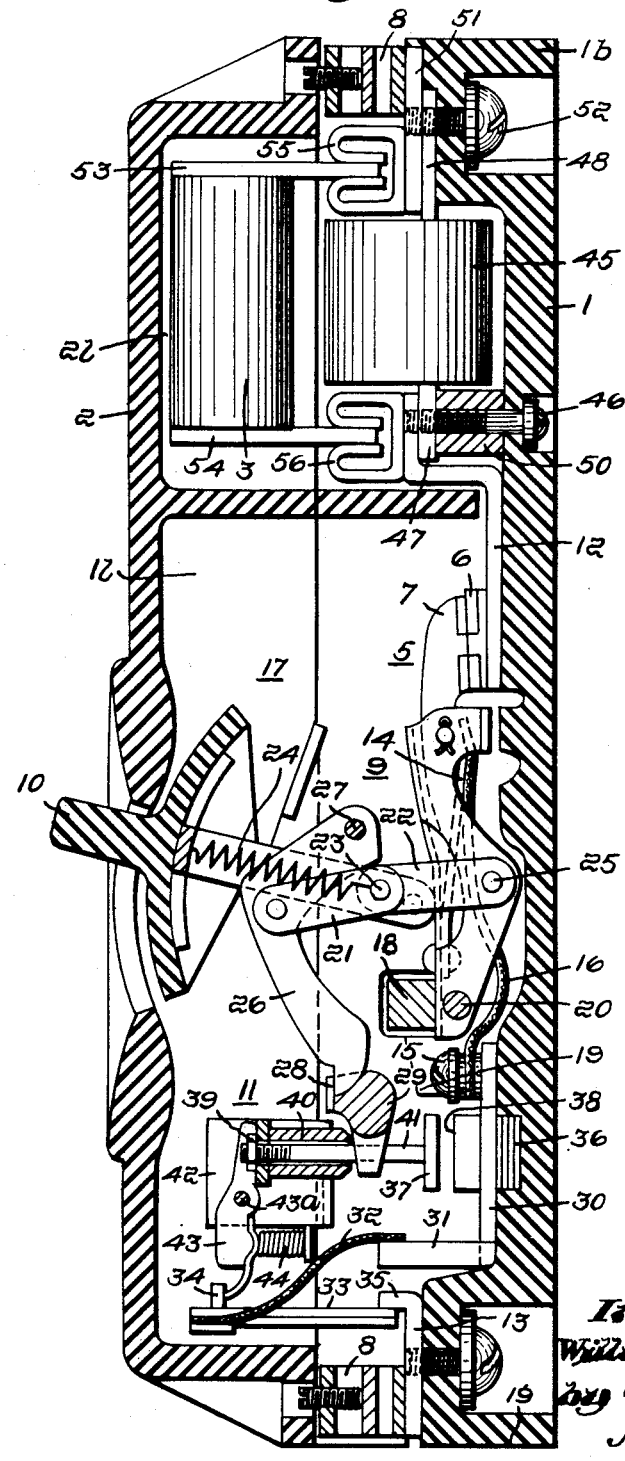

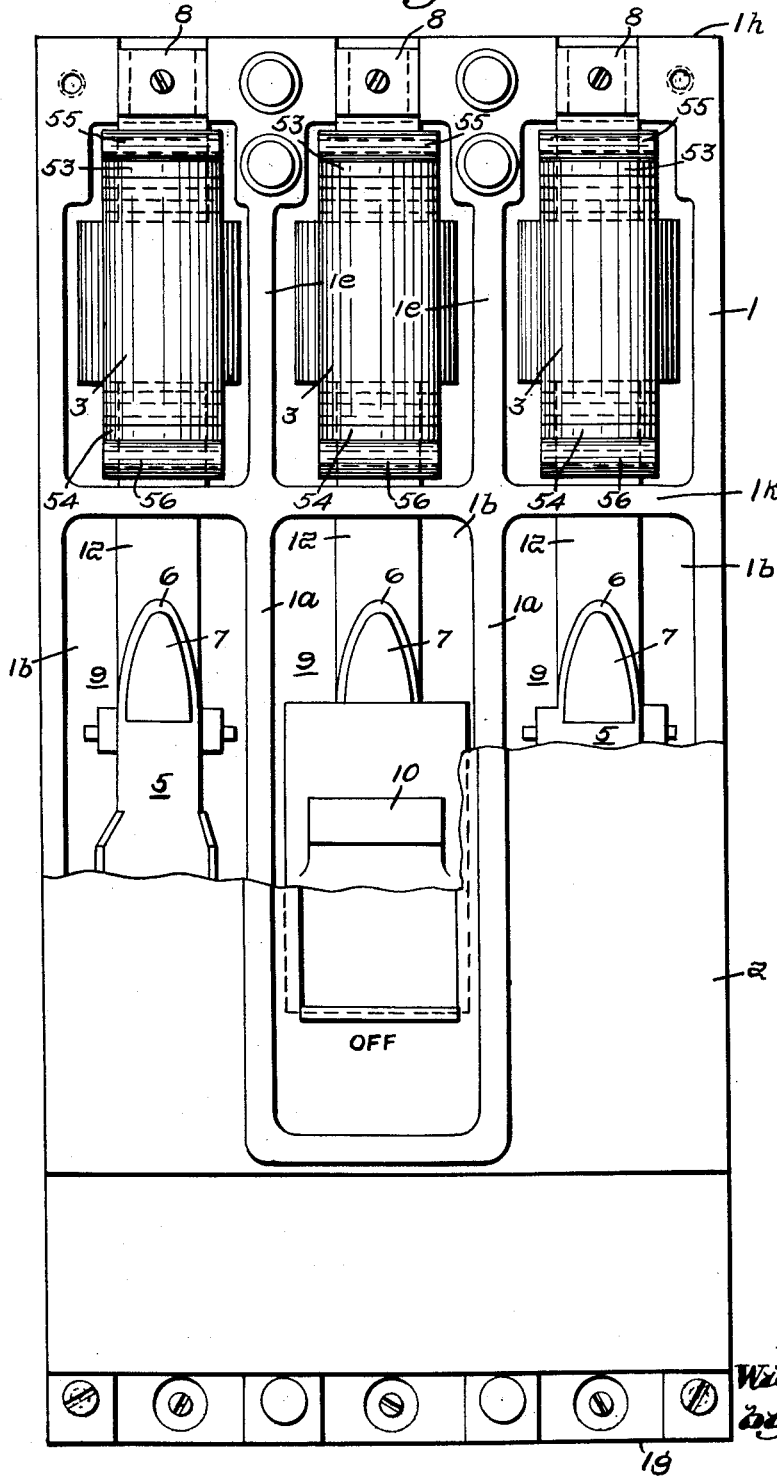

United States Patent Office 2,920,164
Patented Jan. 5, 1960

2,920,164

PROTECTIVE SYSTEMS INCLUDING CIRCUIT INTERRUPTERS AND CURRENT-LIMITING FUSES

William S. Edsall, Boston, Mass., assignor to The Chase-Shawmut Company, Newburyport, Mass.

Application November 1, 1955, Serial No. 544,271

5 Claims. (Cl. 200—114)

This invention relates to protective systems such as widely used, for instance, for the protection of distribution networks and industrial feeder circuits. From a more limited point of view this invention refers to protective systems wherein protection is effected by the joint action of serially connected automatic circuit interrupters or circuit breakers and of current-limiting fuses.

Ever increasing load concentrations resulting in fault currents of ever increasing magnitude make it necessary, or even imperative, to provide circuit breakers for the protection of distribution networks or industrial feeders with current-limiting back-up fuses. Space limitation prevailing in electrical installations tend to make it difficult, if not impossible, to accommodate within the limited space available the current-limiting fuses required for back-up protection of circuit breakers. Recent progress in the design of current-limiting fuses resulting in the development of very compact current-limiting fuses for high current-carrying ratings and high interrupting ratings has somewhat alleviated that difficult situation; however, no positive way out of the aforementioned difficulties has been found to date.

Circuit breakers for the protection of distribution networks and industrial feeder systems have standardized sizes and in layouts of switching systems or switchboards spaces corresponding to these standardized sizes are allocated for the breakers. It is general practice to arrange such breakers in abutting relation, one immediately adjacent the other, leaving no space whatever for accommodating current-limiting back-up fuses except inside the housing of the circuit breakers. There is very little excess space inside the housing of a well designed breaker and therefore it is very difficult to accommodate even the most compactly designed current-limiting fuse inside of the housing of a breaker of standard size.

The problem with which the protective devices design engineer is confronted is more complex than the aforementioned space problem since it is not only necessary to accommodate current-limiting back-up fuses of sufficient current-carrying and interrupting capacity in a very limited space but, in addition thereto, to prevent single-phasing upon blowing of less than all fuses which are inserted into a multiphase circuit. To prevent single-phasing of a multiphase electric circuit upon blowing of less than all the fuses in all the phases of the circuit, the circuit breaker must be caused to open and to interrupt all phases of the circuit upon blowing of but one single fuse therein. This is generally achieved by providing back-up fuses for circuit breakers with so-called striker pins. A striker pin is a pin associated with a fuse and adapted to be acted upon by pre-stored energy as, for instance, a loaded spring, released upon blowing of the fuse to perform such mechanical work as tripping of a circuit breaker. The striker pin may normally be held in position by a restraining wire normally shunted by the fuse links. Upon fusion and rupture of the fuse links by a major fault current, the current density in the restraining wire increases rapidly, resulting in fusion and rupture of the restraining wire. As a result, the striker pin is ejected under the action of its biasing spring and projected against the trip bar of the circuit breaker, causing the latter to open and to interrupt all the phases of the faulted circuit, upon initial interruption by the current-limiting fuses of less than all the phases. Striker pin fuses must be arranged in a circuit breaker in a special way, i.e. in such a way that their striker pin can hit the trip bar of the circuit breaker, or else a special or additional trip linkage or trip impulse transmitting mechanism must be arranged between the striker pins of the fuses and the trip bar of the circuit breaker to transmit the trip impulse of the former to the latter. The space immediately adjacent the trip bar of a circuit breaker is generally fully occupied by various electro-responsive trip devices such as, for instance, electromagnetic trip devices and thermal trip devices. Hence it is generally impossible to arrange current-limiting back-up fuses with striker pins immediately adjacent the trip bar of a circuit breaker and to enable the striker pins to act directly upon the trip bar. Providing a special or additional trip linkage or the like between the striker pins and the trip bar tends to increase the complexity of the structure. Without departing from the standard dimensions an additional trip linkage or the like can generally only be added to large circuit breakers for relatively high current ratings.

The problem of providing current-limiting fuse back-up protection is probably most urgent in the case of circuit breakers generally referred to as molded case circuit breakers. This type of circuit breakers widely used for the protection of distribution networks and industrial feeder circuits comprises a base of molded insulating material having a plurality of parallel partitions molded integral therewith dividing the base into a plurality of separate channels. It is very difficult, if not impossible, to accommodate a plurality of current-limiting back-up fuses in the base of a molded case circuit breaker of standard size, even if resort is made to the most compactly designed current-limiting fuses which are commercially available. If current-limiting fuse back-up protection combined with striker pin tripping is to be provided for molded case circuit breakers, either the area of the base, or the height of the structure, must be increased to make it possible to accommodate the current-limiting fuses and the mechanical connection between the striker pin thereof and the trip bar of the circuit breaker within the enclosure of the latter.

It is, therefore, one object of the invention to provide protective systems particularly for such applications as distribution networks and industrial feeder circuits comprising automatic circuit interrupters or circuit breakers and current-limiting back-up fuses therefor wherein the fuses require a minimum of space and wherein the automatic circuit interrupters or circuit breakers are caused to open all phases of a multiphase circuit upon blowing of less than all the back-up fuses without resorting, in order to achieve this object, to striker pin mechanisms and associated tripping means.

Another object of the invention is to provide protective systems comprising automatic circuit interrupters or circuit breakers of standard size accommodating current-limiting back-up fuses therefor in the standard size enclosure thereof.

A further object of the invention is to provide protective systems comprising automatic circuit interrupters or circuit breakers and current-limiting back-up fuses therefor wherein the back-up fuses are arranged at a convenient point remotely from the trip bar of the circuit interrupter or circuit breaker, and wherein means other than striker pins cause the circuit interrupter or circuit breaker to open all the phases of a multiphase circuit in response to blowing of less than all the back-up fuses.

These and other objects and advantages of the invention will become more apparent from the accompanying drawings and the following description of a preferred embodiment of the invention. In the drawings Fig. 1 is a circuit diagram of a protective system embodying the invention;

Fig. 2 is substantially a sectional view of a molded case circuit breaker taken on the line 2—2 of Fig. 3 accommodating in the housing thereof a plurality of back-up fuses and a plurality of shunt-resistors;

Fig. 3 is substantially a plan view of the structure shown in Fig. 1, and

Figure 1:
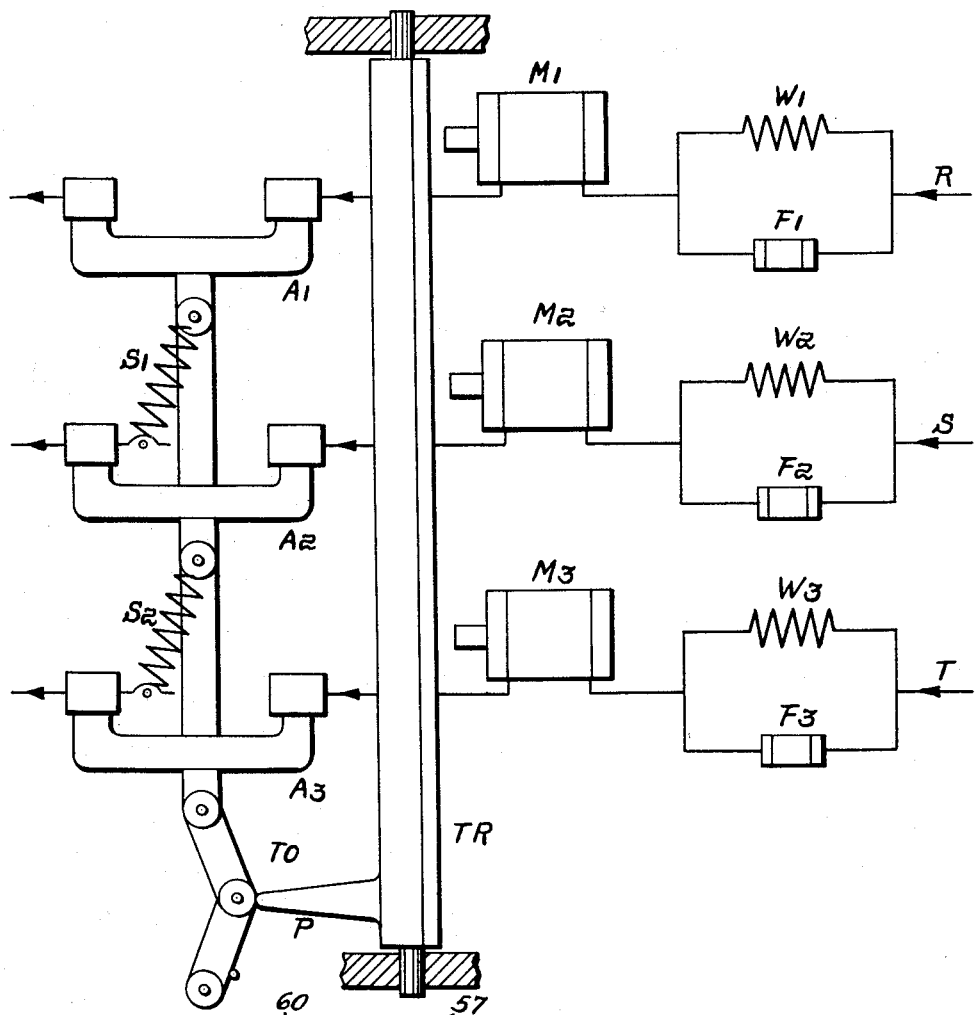

Referring now to the drawing and more particularly to Fig. 1 thereof, reference letters R, S, T have been applied to indicate the three phases of a multiphase circuit. This circuit may be opened and closed by means of an automatic circuit interrupter or circuit breaker comprising pole structures $A_1$, $A_2$, $A_3$ mechanically coupled for joint opening and closing operations. The three pole structures $A_1$, $A_2$, $A_3$ may be jointly operated by an operating mechanism including the overdrawn toggle TO. Two springs $S_1$, $S_2$ tend to separate the contacts of the circuit breaker when the latter is closed but these springs are normally prevented from opening the circuit breaker by the action of the overdrawn toggle TO. An electromagnetic tripping unit $M_1$, $M_2$, $M_3$ is serially arranged in each of the three phases R, S, T and the three aforementioned tripping units control a common trip bar TR adapted to be rocked under the impact of the armatures of the tripping units $M_1$, $M_2$, $M_3$. Upon rocking of trip bar TR toggle TO is pushed over center by a prong P on trip bar TR. As a result, toggle TO collapses under the action of springs $S_1$, $S_2$, thus permitting springs $S_1$, $S_2$ to open the circuit breaker. The protective system comprises also three current-limiting fuses $F_1$, $F_2$, $F_3$ of which each is shunted by a resistor $W_1$, $W_2$, $W_3$. Current-limiting fuses $F_1$, $F_2$, $F_3$ blow only at the occurrence of major fault currents. Upon blowing of any of fuses $F_1$, $F_2$, $F_3$ such fault currents are limited in magnitude by the action of resistors $W_1$, $W_2$, $W_3$ of which each is serially connected to one of the pole structures $A_1$, $A_2$, $A_3$ of the circuit breaker. The current flowing through fuses $F_1$, $F_2$, $F_3$ during the time of a fault plus the current flowing through resistors $W_1$, $W_2$, $W_3$ during the time of a fault upon blowing of any of fuses $F_1$, $F_2$, $F_3$ is sufficiently high and of sufficient duration to fully energize the respective trip unit, or units $M_1$, $M_2$, $M_3$, causing the latter to rock the trip bar TR, resulting in opening of the circuit breaker. Thus blowing of any one of the fuses $F_1$, $F_2$, $F_3$ causes full energization of one of the trip units $M_1$, $M_2$, $M_3$ and rocking of the trip bar TR and interruption of all three phases of the multiphase circuit R, S, T. Hence single-phasing is effectively precluded without resorting to such mechanically relatively complex means as fuses with striker pins.

An important feature of the arrangement illustrated in Fig. 1 resides in the fact that fuses $F_1$, $F_2$, $F_3$ are current-limiting fuses, i.e. fuses the peak let-through current of which is substantially less than the peak of the short-circuit current of multiphase system R, S, T. Current-limiting fuses have relatively short pre-arcing times and arcing times, which means that the time elapsing between fault inception and arc extinction inside of the fuse is short. If the pre-arcing time and the arcing time at the occurrence of major faults are relatively long, as in fuses of the non-current-limiting type, a relatively long time interval elapses between fault inception and ultimate interruption of the faulted circuit by the circuit breaker, and since heat is being generated during all that time in the shunt resistor of the fuse, the shunt resistor must have a relatively large heat absorbing capacity and size. If, on the other hand, the pre-arcing time and the arcing time at the occurrence of major faults are relatively short, i.e. less than a half cycle of a 60 c.p.s. current wave, as in fuses of the current-limiting type, a relatively small time interval elapses between fault inception and ultimate interruption of the faulted circuit by the circuit breaker, and thus the time during which heat is generated in the shunt resistor of the fuse is minimized. As a result, the heat generated in the shunt resistor, the required heat absorbing capacity thereof and the size thereof are all minimized.

Referring now to Figs. 2 and 3 of the drawing, reference numeral 1 has been applied to indicate the base and reference numeral 2 has been applied to indicate the cover or hood of a molded case circuit breaker. Base 1 has a plurality of parallel partitions 1a molded integral therewith dividing base 1 into a plurality of separate parallel channels 1b. Base 1 forms three such channels 1b and supports a circuit interrupter structure comprising three pole structures each accommodated in one of the three channels 1b. Reference numeral 17 has been applied to generally indicate a multipolar circuit breaker structure arranged in a space situated between two opposite parallel sides 1g and 1h of base 1. Three terminals 8 are arranged along each side 1g, 1h of base 1. Terminals 8 arranged at the side 1g are intended to be connected to the load and terminals 8 arranged at the side 1h are intended to be connected to the power supply. The circuit breaker structure 17 comprises three fixed or stationary contacts 6 and three movable contacts 7 adapted to cooperate with the stationary contacts 6. Each of the three movable contacts 7 is mounted upon one of three movable switch arms 5 and forms an integral part thereof. Operating mechanism 9 includes the handle 10 and enables to move contacts 7 into engagement with, and out of engagement from, fixed contact 6. An electroresponsive trip device generally indicated by reference numeral 11 is adapted to cause operating mechanism 9 to automatically separate contacts 7 from contacts 6 upon occurrence of relatively small overloads of inadmissible duration as well as upon occurrence of relatively large fault currents. Trip device 11 is arranged in a space situated between side 1g of base 1 and one side of circuit breaker structure 17, i.e. the lower side thereof assuming base 1 to be mounted on a vertical wall. Each fixed contact 6 is supported by a metal strip 12 secured to base 1 and projecting through an aperture in a partiton 1k extending at right angles to partitions 1a. Each movable contact 7 is provided with a braided shunt 16 conductively connecting the respective movable contact 7 with one of the terminals 15 of trip device 11. The opposite terminals of trip device 11 are formed by metal strips 13 upon which terminals 8 are mounted. Each pole of the circuit breaker includes a leaf spring 14 biasing one of the movable contacts 7 toward its cooperating fixed contact 6.

Cross tie 18 of insulating material joins the three switch arms 5 into a unitary structure to cause simultaneous movement of all contacts 7 to the closed and to the open position thereof. The unitary structure formed by the three switch arms 5 and the cross-tie 18 is pivotally mounted on a frame structure 19 supporting all the parts of the operating mechanism 9 of the circuit breaker and forming an integral part thereof. Reference numeral 20 has been applied to indicate the pins securing the above referred to structural unit 5, 5, 5, 18 to frame structure 19. The operating mechanism 9 comprises also a toggle which is made up of the two toggle links 21, 22. The center pin 23 of toggle 21, 22 is operatively connected to handle 10 by means of the helical overcenter spring 24. Pivot 25 of toggle 21, 22 situated immediately adjacent to base 1 connects one end of toggle 21, 22 pivotally to the central switch arm 5. The opposite end of toggle 21, 22 is pivoted at 25 to a cradle member 26. Pin 27 supports cradle or latch member 26 on frame 19. Normally cradle or latch member 26 is restrained in the position shown by a cooperating latch 28 on a trip bar 29 extending transversely across and pivotally mounted on base 1. Trip bar 29 which is preferably made of insulating material is in turn controlled by the trip device 11. Occurrence of an overload current of excessive duration or of a short circuit current causes operation of trip device 11, as a result of which trip bar 29 is rocked in counterclockwise direction, as seen in Fig. 2. Hence latch 28 releases the lower end of cradle member 26 and the latter is rocked under the action of overcenter spring 24 in clockwise direction about pivot pin 27. This movement of cradle or latch member 26 causes pin 25 to move across the center line of spring 24 which, in turn, causes toggle 21, 22 to collapse under the action of spring 24. During the collapse of toggle 21, 22 pin 25 thereof is moved from right to left, as seen in Fig. 2 and consequently the center switch arm 5 is pulled by spring 24 from the closed position to the open position thereof. Since all three switch arms 5 are tied together by crosstie 18, the outer switch arms 5 and their contacts follow the opening movement of center switch arm 5. Upon tripping of the circuit breaker the operating mechanism thereof may be reset by moving handle 10 in closing direction which causes re-engagement of cradle or latch member 26 and latch 28.

The trip devices 11 comprise electromagnetic tripping means for instantaneous operation adapted to trip at the occurrence of relatively large fault currents and thermal tripping means adapted to trip at the occurrence of relatively small overloads of excessive duration. Each channel 1b of base 1 accommodates an electromagnetic and a thermal tripping means. The current path through one pole of tripping device 11 comprises a conductor 30 fixedly secured to base 1, supporting on the upper end thereof the aforementioned terminal 15 to which braided conductor 16 is attached. The lower end of conductor 30 is provided with a projection or upright 31 to which braided conductor 32 is attached. Conductor 32 establishes a current path between bimetal strip 33 and conductor 30 or upright 31, respectively. The end of bimetal strip 33 remote from base 1 is provided with a steel pin 39 intended to serve as a latch element, whereas the end of bimetal strip 33 adjacent to base 1 is supported by conductor 13 fixedly secured to base 1. The upper portion of conductor 30 is arranged inside of a plurality of U-shaped steel laminations 36 which are magnetized upon flow of a large fault current through conductor 30. Movable armature 37 is biased by suitable spring means (not shown) away from base 1 and away from the pole surfaces 38 of magnetized steel laminations 36. Armature 37 is provided with a stem 41 arranged inside of a sleeve member 40 and provided with a screw nut 39 at the end thereof opposite from armature 37. If attracted toward pole surfaces 38, armature 37 moves nut 39 and sleeve 40 from left to right—as seen in Fig. 2—which results in a counter-clockwise rocking motion of trip bar 29. Consequently latch 28 forming an integral part of trip bar 29 is moved out of engagement with cradle or latch member 26. Hence toggle 22, 23 is caused to collapse under the action of spring 24 and contacts 7 are caused to part from contacts 6.

Trip device 11 further comprises in each pole thereof a frame 42 fixedly mounted on base 1 and supporting a latch member 43 pivotally mounted at 43a, biased by a helical spring 44 and normally engaging steel pin 34 on bimetal strip 33. The latter is heated by $i^2 \cdot r$ losses occurring therein. Overloads of excessive duration cause downward bending of bimetal strip 33, resulting in disengagement of steel pin 34 from latch member 43. Consequently latch member 43 is free to rotate under the action of helical spring 44 in clockwise direction—as seen in Fig. 1— about pin 43a, causing a movement of sleeve 40 from left to right. Consequently trip bar 29 is rocked counterclockwise, causing disengagement of latch 28 from cradle or latch member 26 and parting of contacts 7 from contacts 6.

The transverse partition 1k forms an integral part of base 1 and separates current-limiting fuses 3 and shunt resistors 45 from the circuit breaker structure 17. Conductors 12 extend across or through partitions 1k and are fixedly secured to base 1 by means of screws 46. Resistor 45 is substantially in the shape of a cylinder and comprises two blade contacts 47 and 48 for inserting the resistor into the circuit of the circuit breaker. Blade contact 47 is arranged between an insulating spacer 50 and the upper end of conductor 12 and blade contact 48 is jointly held in position with conductor 51 by a screw 52. The conductors 51 of each phase support the aforementioned terminals 8 situated at the side 1h of base 1. Each current-limiting fuse 3 is provided with blade contacts 53, 54 arranged at right angles with respect to the general plane of base 1, each engaging one of a pair of fuse holders 55 and 56. Fuse holder 56 is supported by conductor 12 and fuse holder 55 is supported by conductor 51.

The size of current-limiting fuses 3 is relatively small. This is due to the fact that fuses 3 are considerably undersized, i.e. the interrupting capacity thereof is less than that normally required for back-up protection of the circuit breaker. The shunt resistors 45 reduce the current flow through and the recovery voltage across the circuit breaker upon blowing of fuses 3 to the point of enabling the fuse or fuses 3 to provide effective back-up protection for the circuit breaker. This back-up protection of fuses 3 is limited to the arcing time thereof; hence the physical dimensions of fuses 3 may be small.

If the number of fuses blown is less than three, say but one, this still results in opening of all poles of the circuit breaker since blowing of any fuse 3 causes energization of the electromagnetic tripping means 36, 37 associated with that particular phase and consequently unlatching of latch 28.

Tripping means 36, 37 require fairly high currents for the operation thereof and consequently resistors 45 must be able to carry fairly high currents. Though these transient currents may be limited to say the order of one cycle of a current wave of 60 c.p.s., the design of resistors 45 still involves some problems. The resistance material therein may become incandescent for an instant. This is not objectionable, considering that the operating temperature of current-limiting fuses is far higher during the transient period of the operation thereof. Resistors 45 must be designed in such a way that the heat which is absorbed therein during their transient operating period is an optimum. Because of the shortness of the times involved heat absorbing capacity is of no use if it takes time to transfer the heat from a point where it is generated to another point where it can be absorbed. In other words, the resistors 45 ought not to rely on heat transfer for heat absorption during the transient period of their operation; the resistance material of the resistors ought to be as heat absorbent as possible to absorb whatever heat is generated right at the point where generated so as to avoid any time delay involved in cooling by heat exchange, or heat transfer.

Figure 4:
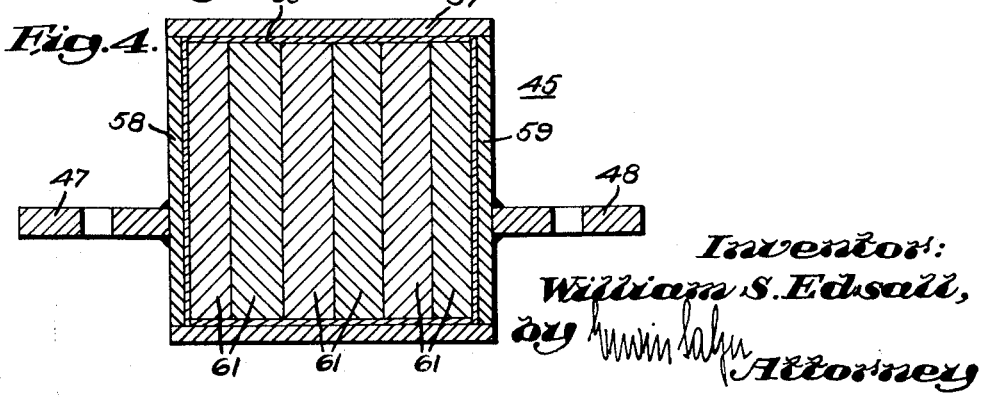
Fig. 4 is substantially a sectional view of a resistor for limiting the magnitude of the current which flows through the backed-up circuit breaker upon blowing of one of the back-up fuses.

The resistor 45 shown in Fig. 4 comprises a housing or casing 57 of steel which is lined with a thermally resistant insulator 60, as for instance, asbestos. Casing 57 is filled with a plurality of cylindrical blocks 61 of suitable resistance material such as carbon. The ends of casing 57 are closed by thin asbestos lined metal plates 58, 59 held in position by appropriate screws, or the like (not shown). These plates 58, 59 occupy very little space and almost the entire internal volume of casing 57 is filled with resistance material or, in other words, the resistance material is substantially coextensive with the internal volume of casing 57. As a result, substantially the entire volume of casing 57 is being used as a generator of heat as well as an absorber of heat. Assuming even current distribution across resistor blocks 61, each point inside of casing 57 contributes substantially to the same extent to the generation and to the absorption of heat.

It will be noted that insulating barriers 1a have extensions in the form of barriers 1e of which each separates pairs of shunt resistors 45. Resistors 45 are arranged at a lower level than fuses 3 each substantially in registry with one of the three fuses 3 inside one of the channels formed by extensions 2l of cover barriers 1. Fuses 3 are arranged in the space defined by partitions 1l, 2l but above base 1 and are separated from each other by extensions 2l of partitions 1l provided in cover 2.

On occurence of small overloads bending of bimetal strips 33 causes rocking of trip bar 29 and separation of all contacts 6, 7. In case of fault currents of larger magnitude yet still well within the interrupting capacity range of the circuit breaker, armature 37 is attracted by pole faces 38 and causes rocking of trip bar 29 and separation of all contacts 6, 7. Fuses 3 do not blow unless a major fault current occurs close to the limit of, or above of, the interrupting capacity of the circuit breaker. The let-through current through any of the fuses 3 plus the current flowing after blowing of any of the fuses 3 through shunt resistor 45 associated with the respective fuse are sufficiently high and of sufficient duration to energize the magnet system 30, 36, 41 to cause rocking of trip bar 29 and separation of all contacts 6, 7. The fuses, if blown, ought to be replaced before any attempt is made to reclose the circuit breaker. Nothing happens if the circuit breaker is reclosed upon blowing of all three fuses before proper replacement thereof. If less than all three fuses are blown and the circuit breaker is improperly reclosed before replacement of the blown fuse or fuses is effected, a current of limited magnitude is allowed to flow, causing electromagnetic or thermal tripping of the circuit breaker and thus warning the operator of the circuit breaker that the fault is still on.

If desired, an electromagnetic interlock may be provided to preclude reclosing of the circuit breaker prior to renewal of blown fuses. However, as a general rule, such an interlock is not needed and has, therefore, not been shown.

While, in accordance with the patent statutes, I have disclosed the specific details of one embodiment of the invention, it is to be understood that these details are merely illustrative and that many variations thereof may be made without departing from the spirit and the scope of the invention. It is my desire, therefore, that the language of the accompanying claims shall be accorded the broadest reasonable construction and shall be limited only by what is expressly stated therein and by the prior art.

I claim the following as my invention:

1. In a protective system the combination of a base of molded insulating material having a plurality of parallel partitions molded integral therewith dividing said base into a plurality of separate parallel channels, an automatic circuit interrupter structure having a plurality of pole structures each accommodated in one of said plurality of channels, said interrupter structure comprising a plurality of tripping means instantaneously responsive to fault currents one associated with each of said plurality of pole structures and a transverse trip bar common to said plurality of pole structures operative in response to each of said plurality of tripping means, a plurality of current-limiting back-up fuses for said interrupter structure each serially related to one of said plurality of pole structures and each arranged in alignment with one of said plurality of channels, and a plurality of resistors each shunted across one of said plurality of fuses and each accommodated in one of said plurality of channels, each of said plurality of resistors having a sufficiently low resistance to permit full energization of one of said plurality of tripping means upon blowing of one of said plurality of fuses to cause said common trip bar to effect simultaneous opening operations of said plurality of pole structures.

2. In a protective system the combination of a base of molded insulating material having a plurality of parallel partitions molded integral therewith dividing said base into a plurality of separate parallel channels, an automatic circuit interrupter structure having a plurality of pole structures each accommodated in one of said plurality of channels, said interrupter structure comprising a plurality of electromagnetic tripping means instantaneously responsive to fault currents one associated with each of said plurality of pole structures and a transverse rockable trip bar common to said plurality of pole structures operative in response to each of said plurality of tripping means, a plurality of current-limiting back-up fuses for said interrupter structure each serially related to one of said plurality of pole structures and each associated with one of said plurality of channels, and a plurality of resistors each shunted across one of said plurality of fuses and each accommodated in one of said plurality of channels, each of said plurality of resistors comprising a casing internally lined with thermal insulating material and having a predetermined internal volume accommodating a body of resistance material substantially coextensive with said internal volume, and each of said plurality of resistors having a sufficiently low resistance to permit full energization of one of said plurality of tripping means upon blowing of one of said plurality of fuses to cause said common trip bar to initiate simultaneous opening operations of said plurality of pole structures.

3. In a protective system the combination of a base of molded insulating material having a plurality of parallel partitions molded integral therewith dividing said base into a plurality of separate parallel channels, a multipolar automatic circuit interrupter structure arranged in a space situated between two opposite parallel sides of said base having a plurality of pole structures each accommodated in one of said plurality of channels, said interrupter structure comprising a plurality of tripping means instantaneously responsive to fault currents one associated with each of said plurality of pole structures and a transverse trip bar common to said plurality of pole structures operative in response to each of said plurality of tripping means, said plurality of tripping means and said trip bar being arranged in a space situated between said interrupter structure and one of said two opposite sides of said base, a plurality of current-limiting back-up fuses for said interrupter structure arranged in a space situated between said interrupter structure and the other of said opposite sides of said base each serially related to one of said plurality of pole structures, and a plurality of resistors arranged in the space situated between said interrupter structure and the other of said opposite sides of said base, each of said plurality of resistors being shunted across one of said plurality of fuses, and each of said plurality of fuses and each of said plurality of resistors being aligned with one of said plurality of channels.

4. In a protective system the combination of a base of molded insulating material having a plurality of parallel partitions molded integral therewith dividing said base into a plurality of separate parallel channels, a multipolar automatic circuit interrupter structure arranged in a space situated between two opposite parallel sides of said base having a plurality of pole structures each accommodated inside of one of said plurality of channels, said interrupter structure comprising a plurality of electromagnetic tripping means one associated with each of said plurality of pole structures and a transverse trip bar common to said plurality of pole structures operative in response to each of said plurality of tripping means, said plurality of tripping means and said trip bar being arranged in a space situated between said interrupter structure and one of said opposite sides of said base, a plurality of current-limiting back-up fuses for said interrupter structure each serially related to one of said plurality of pole structures, each of said plurality of fuses being arranged in a space situated between said interrupter structure and the other of said two opposite sides of said base, and a plurality of resistors each shunted across one of said plurality of fuses, said plurality of resistors being arranged at a lower level above said base structure than said plurality of fuses and each of said plurality of resistors being arranged in substantial registry with one of said plurality of fuses inside of one of said plurality of channels.

5. In a protective system the combination of a base of molded insulating material having a plurality of parallel partitions molded integral therewith dividing said base into a plurality of separate channels, an automatic circuit interrupter structure having a plurality of pole structures each accommodated in one of said plurality of channels, said interrupter structure comprising a plurality of electromagnetic tripping means instantly responsive to fault currents one associated with each of said plurality of pole structures and a transverse rockable trip bar common to said plurality of pole structures operative in response to each of said plurality of tripping means, a plurality of pairs of fuse holders, each of said plurality of pairs of fuse holders being arranged in one of said plurality of channels in alignment with one of said plurality of pole structures, a plurality of current-limiting back-up fuses for said interrupter structure each engaging one of said plurality of pairs of fuse holders and each serially related to one of said plurality of pole structures, and a plurality of resistors each arranged in one of said plurality of channels under one of said plurality of fuses shunting one of said plurality of pairs of fuses and each of said plurality of resistors having a sufficiently low impedance to permit full energization of one of said plurality of tripping means upon blowing of one of said plurality of fuses.

References Cited in the file of this patent

UNITED STATES PATENTS

| Number | Name | Date |
|---|---|---|
| 815,317 | Bradley | Mar. 13, 1906 |
| 1,294,621 | Conrad | Feb. 18, 1919 |
| 1,327,777 | Randall | Jan. 13, 1920 |
| 2,140,360 | Jennings | Dec. 13, 1938 |
| 2,337,495 | Rawlins | Dec. 21, 1943 |
| 2,337,504 | Strom | Dec. 21, 1943 |
| 2,358,215 | Darling | Sept. 12, 1944 |
| 2,416,951 | Prince | Mar. 4, 1947 |
| 2,473,196 | Dannenberg | June 14, 1949 |
| 2,483,577 | Fahnoe | Oct. 4, 1949 |
| 2,794,095 | Kozacka | May 28, 1957 |
| 2,824,929 | Edmunds | Feb. 25, 1958 |
| 2,843,702 | Edmunds | July 15, 1958 |